Dec. 20, 1960  J. A. I. ÖHLUND  2,965,878
BALLISTIC MISSILE SHOCK WAVE DETECTOR
Filed March 6, 1956  2 Sheets-Sheet 1

2,965,878

BALLISTIC MISSILE SHOCK WAVE DETECTOR

John Alex Ingvar Öhlund, Huskvarna, Sweden, assignor to Svenska Aeroplan Aktiebolaget, Linkoping, Sweden, a corporation of Sweden Filed Mar. 6, 1956, Ser. No. 569,865

7 Claims. (Cl. 340—16)

The present invention relates to an arrangement in hit indicators for recording hits during firing practice at targets, of the kind comprising a microphone or transducer of magnet type located in a hollow, foraminous body, which microphone type transducer is sensitive to pressure impulses from the shock wave of missiles passing the transducer and is operable to generate electrical impulses, the strength of which varies in response to the strength of the pressure impulse, and a recording apparatus connected to the transducer which is operable to record those of the electrical impulses emanating from the transducer that exceed a certain minimum value and thus register these as hits.

The recording accuracy obtained by means of such a known hit indicator depends to a great extent on how the transducer is constructed and arranged in the body. The transducer hitherto used for this purpose have not worked with the accuracy desired, and the object of this invention is to provide a transducer arrangement by means of which it is possible to obtain a considerably greater accuracy at the recording of hits than it has been possible to obtain with known transducer arrangements.

This and other objects of the invention will more fully appear from the following description in connection with the accompanying drawings, in which:

Figure 3 is a perspective view showing the mounting of the transducer in the body.

Figure 1:
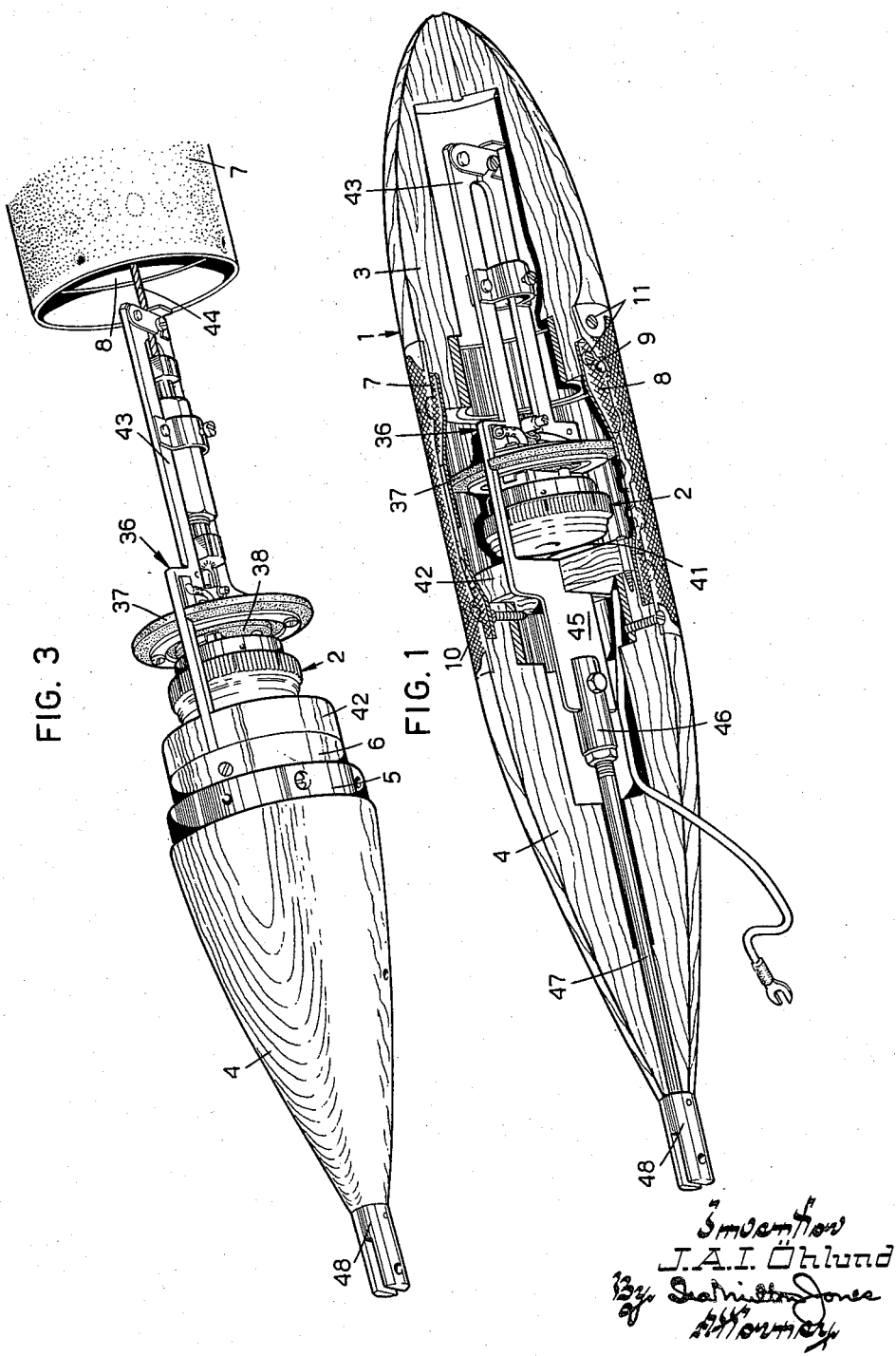
Figure 1 is a perspective longitudinal sectional view, showing an embodiment with a transducer arrangement according to the invention.
Figure 2:
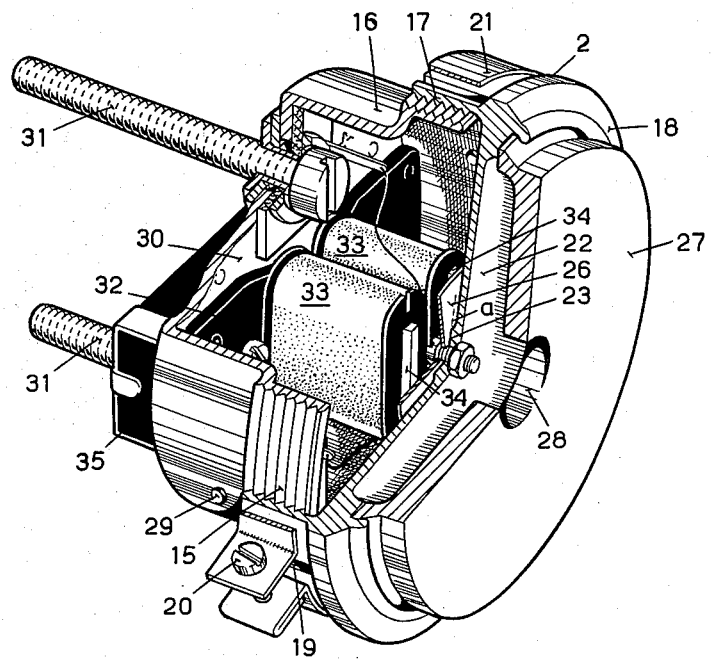
Figure 2 is a perspective view in a larger scale, partly in section, of the transducer.

On the drawings, 1 designates a hollow, streamlined body arranged to be suspended in a target, not shown, while 2 designates a transducer enclosed in the body. The body consists of a wooden nose cone 3 and a wooden tail cone 4, which are provided with annular turning ridges or steps 5 and 6 on their ends facing each other, and two concentric spacer tubes 7 and 8, the terminals of which are telescoped over the ridges 5 and 6 respectively. The walls of the spacer tubes are provided with a number of lines of holes, and each tube is covered by a fine metal gauze 9 and 10 respectively, which together with the tubing are fastened by screws 11 to the ridges 5 and 6 respectively.

The transducer 2 comprises a substantially cup-shaped transducer housing 16 provided with an outer thread 15, and a closure 18 provided with an internally threaded flange 17 by which the closure can be screwed on to the housing. In the flange there are a number of longitudinal slots 19, and round the flange a clamp strip 21 extends by means of which the closure can be secured to the housing in any desired position of axial adjustment. The central portion of the closure comprises a diaphragm or membrane 22 of non-magnetic, relatively soft material, for instance soft aluminum or Bakelite with comparatively great selfdamping ability. The membrane and the closure are, as shown on the drawing, preferably made in one piece with a view to keeping the natural frequency and sensitivity characteristics of the membrane stable as distinguished from known steel membranes which have been difficult to fasten so as not to change the initial forces of the membrane and thus its characteristic due to change in temperature, displacements of the membrane etc. At the centre the membrane is formed with an inwardly projecting short shoulder 23 of relatively small diameter, and on the shoulder is fastened an armature 26 of magnetic material in the form of a disk with considerably greater diameter than that of the shoulder 23. The armature is secured to the membrane or diaphragm by means of a screw 24 extending coaxially through the diaphragm and armature and a nut 25. The shoulder 23 separates the main part of the armature from the membrane 22 to prevent jarring noise arising between the armature and the membrane when the membrane oscillates. Overlying the diaphragm and axially spaced therefrom is a cover 27, which is slightly dished and has its marginal edge portion joined to the marginal edge portion of the closure 18 in any suitable manner so that the cover provides an enclosure for the diaphragm which is imperforate except for a central aperture 28 in the cover. The purpose of the central hole 28 is to admit the pressure impulses at the centre of the membrane. It has been proved that if a pressure impulse attacks the diaphragm from one side thereof, it effects one edge of the membrane and propagates at the speed of sound over the surface of the membrane. The signal will then be distorted and dependent on the direction of attack of the pressure wave. The imperforate enclosure for the diaphragm provided by the cover 27, providing an entry to the diaphragm only through the center aperture 28, compels a pressure wave, regardless of its direction of attack, to always effect the membrane at the same location and propagate uniformly over its surface. In order to keep the same air pressure on both sides of the membrane, the transducer housing 16 has a number of vents 29 round its periphery.

Through the bottom wall designated by 30 of the transducer housing two insulating contact screws 31 extend, each connected in series to a pair of windings 33 on a Bakelite plate 32. The windings extend longitudinally through the major part of the housing and at its outer end of each winding there is a magnetic pole 34 straight in front of the armature 26. The distance $a$ between the magnet pole 34 and the armature 26, which distance determines the sensitivity of the transducer is, as mentioned previously, adjustable by turning and locking the cover 18 on the housing 16. For creating a magnetic field through the windings a permanent magnet 35 is mounted on the bottom wall of the housing.

For the purpose of eliminating or reducing the effect of disturbances in the transducer due to shocks etc, it is resiliently suspended in a frame 36 in the body by means of a rubber pad 37 outside the housing 16 through which extend the two contact screws 31. The rubber pad is secured on the screws between two insulating disks 38 by means of spacer sleeves and nuts applied on the screws 31. The frame consists of an elongated plate with a centre opening 41 for the transducer unit which by means of the rubber pad 37 is secured to the frame adjacent to the sides of the opening. The plate is mounted in a wooden disk 42 and has a connector element 43 projecting into a cavity in the nose cone. To the connector element 43 is attached a towing cable 44 which is provided with a double-conductor and extends longitudinally through the nose cone. The rear end of the frame is formed with a part 45, which projects into a cavity in the tail cone, and the free end of part 45 is connected by means of a clevis 46 to a pull rod 47 extending longitudinally through the tail cone, and this rod in its turn is attached to the target by means of another clevis 48. The frame in the body will thus bear all the tension load when the target is towed in the air.

The outer terminals of the contact screws 31 are connected to the double-conducted cable which is connected to a recorder, not shown, in the towing aircraft.

When a projectile passes the target, the pressure impulse of the shock wave is transmitted via the holes in the spacer tubes 7 and 8 and the hole 28 in the bottom wall 27 of the cover to the membrane 22 which is moved thereby, causing it to carry the armature 26 to and from the magnet poles 34. In the windings 33 is thus induced a voltage which is proportional to the rate of movement of the armature which rate in its turn is dependent upon the strength of the pressure impulse. If the electric impulse exceeds a certain minimum value, the recorder in the aircraft connected to the transducer will react and a hit in the target is recorded.

What I claim as my invention is:

1. A transducer for generating electrical impulse signals in response to shock waves produced by passage of ballistic missiles in the vicinity of the transducer, said transducer comprising: a substantially cup-shaped housing; a substantially cup-shaped closure for the housing, the side wall of which closure is integral with its end wall, and the end wall of which comprises a diaphragm of substantially soft nonmagnetic material having pronounced self-damping characteristics, the side wall of the housing and the side wall of said closure having cooperating threads by which the closure is secured to the housing; electrical impulse generating means in the housing including relatively fixed and movable magnetic members and a coil of wire in which a current is generated in consequence of change in the flux field of said magnetic members due to movement of the movable magnetic member relative to the fixed one, the fixed magnetic member being secured to the housing and the relatively movable magnetic member being secured to the diaphragm near its center for movement with the diaphragm; the threaded connection between the housing and the closure providing for axial adjustment of the diaphragm to carry the relatively movable magnetic member toward and from the relatively fixed magnetic member and thus afford adjustment of the sensitivity of the transducer; and a rigid cover on the housing overlying and spaced from but adjacent to the outer face of the diaphragm and cooperating with the housing to provide an enclosure for the diaphragm which is imperforate except for a central aperture in the cover through which shock wave impulses can reach the diaphragm, so that said cover constrains such impulses to attack the diaphragm substantially centrally thereof, regardless of the direction from which said impulses emanate.

2. The transducer of claim 1, further characterized by the fact that the side wall of the cup-shaped closure is provided with axial slits; and further characterized by a clamping strip surrounding said side wall, and means on said strip for releasably tightening the same around said side wall so that the strip holds the diaphragm in any desired position of axial adjustment and so that said strip can be loosened to permit adjustment of the diaphragm.

3. A transistor for generating electrical impulse signals in response to shock waves produced by passage of ballistic missiles in the vicinity of the transducer, said transducer comprising: a diaphragm of substantially soft material having pronounced self damping characteristics; means cooperable with the diaphragm to define an enclosed housing of which the diaphragm provides one wall, said means providing a threaded connection between the diaphragm and the remainder of the housing by which the diaphragm is axially adjustable relative to the remainder of the housing; a substantially disc-like armature; means providing a rigid connection between the central portion of the armature and the central portion of the diaphragm whereby the armature is supported inside the housing body for movement with the diaphragm; permanent magnet means fixed in the housing body and having pole faces adjacent to said armature; conductive coils surrounding said permanent magnet member and in which coils currents may be generated in consequence of movements of the armature relative to the pole pieces; and a rigid cover overlying and spaced from but adjacent to the outer face of the diaphragm, said cover being fixed with respect to the housing defining means and cooperating therewith to provide an enclosure for the diaphragm which is imperforate except for a central aperture in said cover through which shock wave impulses may travel to the diaphragm, and by which cover such impulses are constrained to attack the diaphragm substantially centrally thereof, regardless of the direction from which said impulses emanate.

4. A transducer of the type which includes cooperating relatively fixed and movable magnetic members and a coil of wire inductively associated with one of said members and in which electrical impulse signals are generated in response to shock waves produced by passage of ballistic missiles in the vicinity of the transducer, said transducer comprising: means defining a housing having side walls and a pair of spaced apart end walls, one of said end walls being substantially rigid and having the relatively fixed magnetic member mounted thereon, and the other end wall comprising a diahpragm of substantially soft, nonmagnetic material having substantial self-damping ability, said diaphragm having the relatively movable magnetic member secured to the central portion thereof for motion therewith, and the side walls cooperating with the end walls to provide a substantially complete enclosure for the cooperating magnetic members; and means on the housing connected with one of said magnetic members for adjustably moving the fixed and movable members relatively toward and from one another, to provide for adjustment of the sensitivity of the transducer.

5. The transducer of claim 4, further characterized by means defining a cover fixed with respect to the housing and having an outer marginal portion engaged with the outer marginal portion of the diaphragm, said cover overlying the face of the diaphragm remote from the magnetic members and being spaced from the central portion of the diaphragm, and that portion of the cover which overlies the diaphragm being imperforate except for an opening substantially axially in line with the center of the diaphragm by which shock waves approaching the diaphragm are compelled to attack the same substantially at its center.

6. In a device which is used with recording apparatus to detect the passage of ballistic missiles during firing practice at a target and record the accuracy with which the missiles are aimed: a rigid frame having elongated lengthwise extending members held in laterally spaced apart relationship; connector means at the front of the frame by which the frame can be connected with a towing vehicle; other connector means at the rear of the frame by which a target to be towed can be connected with the frame; a transducer responsive to shock waves due to the passage of ballistic missiles to produce electrical impulse signals; resilient means connecting the transducer with the frame, yieldably suspending the transducer between said elongated lengthwise extending members; and means providing a streamlined enclosure for the frame and the transducer which enclosure is secured to the frame and is foraminous in the neighborhood of the transducer.

7. The device of claim 6, further characterized by a towing cable connected to said first designated connector means; and further characterized by electrical conductor means in said towing cable connected with the transducer.

(References on following page)

References Cited in the file of this patent

UNITED STATES PATENTS

| | | |
|---|---|---|
| 1,545,525 | Sell | July 14, 1925 |
| 1,738,653 | Inglis et al. | Dec. 10, 1929 |
| 1,845,733 | Warner | Feb. 16, 1932 |
| 1,913,318 | Greibach | June 6, 1933 |
| 2,073,561 | McCracken | Mar. 9, 1937 |
| 2,231,084 | Morrison et al. | Feb. 11, 1941 |
| 2,250,471 | Bruin | July 29, 1941 |
| 2,448,587 | Green | Sept. 7, 1948 |
| 2,548,947 | Clewell | Apr. 17, 1951 |
| 2,783,047 | Faxen | Feb. 26, 1957 |

FOREIGN PATENTS

| | | |
|---|---|---|
| 24,062 | Great Britain | 1898 |
| 21,328 | Great Britain | Nov. 3, 1910 |
| 222,196 | Great Britain | Sept. 25, 1924 |
| 672,782 | Great Britain | May 28, 1952 |

OTHER REFERENCES

Acoustic Firing Error Indicator, by M. C. Blisson et al., Electronics, October 1952, pp. 98–101.

UNITED STATES PATENT OFFICE
CERTIFICATION OF CORRECTION

Patent No. 2,965,878                  December 20, 1960

John Alex Ingvar Öhlund

It is hereby certified that error appears in the above numbered patent requiring correction and that the said Letters Patent should read as corrected below.

Column 1, line 31, for "The transducer" read -- The transducers --; column 3, line 65, for "transistor" read -- transducer --; column 4, line 30, for "diahpragm" read -- diaphragm --.

Signed and sealed this 30th day of May 1961.

(SEAL)
Attest:

ERNEST W. SWIDER
Attesting Officer

DAVID L. LADD
Commissioner of Patents